United States Patent
Greenzeiger

(10) Patent No.: US 9,582,811 B2
(45) Date of Patent: Feb. 28, 2017

(54) ACTIVE TIME SPENT OPTIMIZATION AND REPORTING

(71) Applicant: Apple Inc., Cupertino, CA (US)

(72) Inventor: Michael Froimowitz Greenzeiger, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 644 days.

(21) Appl. No.: 14/036,310

(22) Filed: Sep. 25, 2013

(65) Prior Publication Data

US 2015/0088634 A1    Mar. 26, 2015

(51) Int. Cl.
G06Q 30/00 (2012.01)
G06Q 30/02 (2012.01)

(52) U.S. Cl.
CPC ..... *G06Q 30/0244* (2013.01); *G06Q 30/0267* (2013.01); *G06Q 30/0272* (2013.01)

(58) Field of Classification Search
CPC .................................................. G06Q 30/0272
USPC ...................................................... 705/14.68
See application file for complete search history.

(56) References Cited

U.S. PATENT DOCUMENTS

| 8,484,676 | B1 | 7/2013 | Narsimhan et al. |
| 2007/0244739 | A1* | 10/2007 | Soito ............ G06Q 30/02 705/7.29 |
| 2009/0055383 | A1 | 2/2009 | Zalewski |
| 2012/0071131 | A1 | 3/2012 | Zisapel et al. |
| 2013/0066725 | A1* | 3/2013 | Umeda ........... G06Q 30/0275 705/14.66 |
| 2013/0222137 | A1 | 8/2013 | Alameh et al. |

FOREIGN PATENT DOCUMENTS

| JP | 2014063380 A | * | 4/2014 | ......... G06F 13/00 |
| WO | 03/043356 | | 5/2003 | |

* cited by examiner

*Primary Examiner* — James A Reagan
(74) *Attorney, Agent, or Firm* — Polsinelli LLP

(57) ABSTRACT

Systems, methods, and computer-readable storage media for optimizing and reporting time spent by a user engaged in a session. The system first obtains data associated with a presentation of an item of content at a mobile device, the presentation being divided into multiple partitions. Based on the data, the system adjusts at least one respective length of time associated with the multiple partitions to yield at least one adjusted length of time, the at least one adjusted length of time reflecting estimated time of user engagement with content associated with at least one of the multiple partitions. The system then determines an amount of time spent by a user at the mobile device engaging in the presentation based on the at least one adjusted length of time and the multiple partitions.

26 Claims, 4 Drawing Sheets

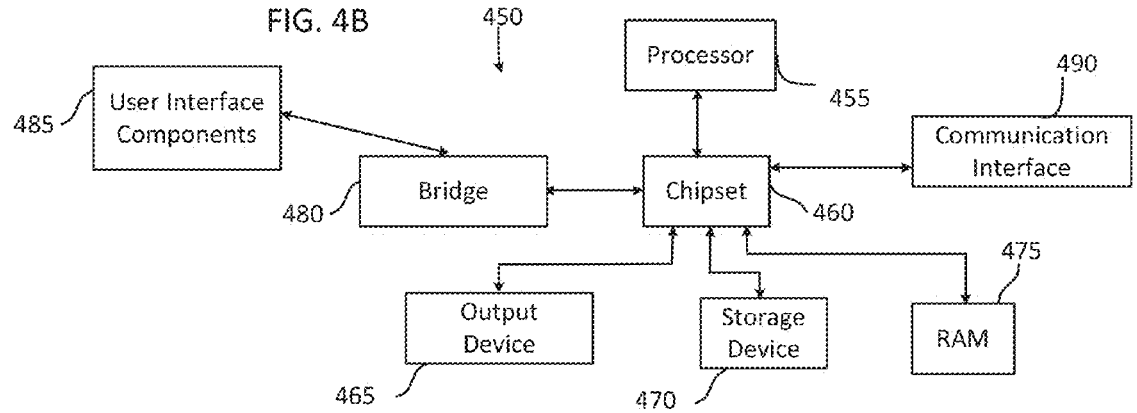
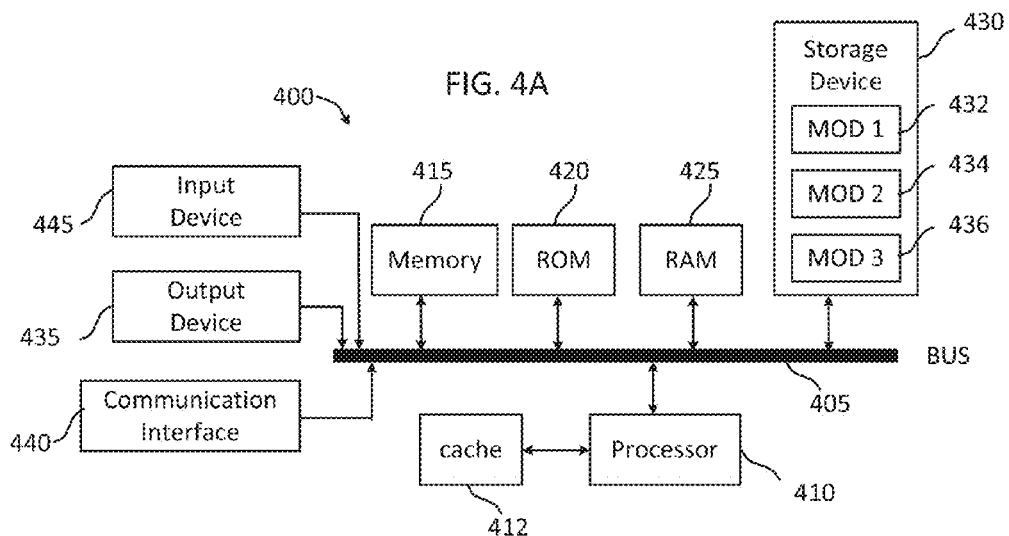

ACTIVE TIME SPENT OPTIMIZATION AND REPORTING

TECHNICAL FIELD

The present technology pertains to advertising, and more specifically pertains to metrics for optimizing and reporting user engagement.

BACKGROUND

Mobile advertising is widely used by advertisers to market their products via mobile devices. Given the widespread availability of mobile devices, mobile advertising can be an extremely effective way for advertisers to reach a wide mass of potential customers and induce numerous users to purchase their products. By targeting mobile users with effective mobile advertisements, advertisers can yield large financial returns from their mobile advertisements. Not surprisingly, many advertisers continuously measure the performance of their advertisements to understand how, if necessary, they can optimize their advertisements for a better performance.

Many metrics are currently available for advertisers to measure the performance of their advertisements. For example, advertisers can measure the ratio of conversions obtained through their advertisements. In addition, advertisers can typically measure the number of views of a particular advertisement, to estimate the number of users reached by the particular advertisement and advertisement medium used. Unfortunately, however, it is generally difficult for advertisers to compare different advertisements based on the number of views measured, particularly when the different advertisements have varying amounts of content. Moreover, advertisers are currently unable to accurately and effectively determine the user's time spent engaging in an advertisement, and thus are limited in their understanding of the effects and performance of their advertisements. Consequently, advertisers are greatly limited in their ability to optimize their advertisements. And without accurate information regarding the user's engagement in an advertisement, it is very difficult to prevent click fraud from publishers seeking to inflate the metrics for their applications, without actually showing the advertisements to real users.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to determine a user's active time spent, which can refer to an amount of time spent by a user engaged in content provided in a user session. The user's active time spent can be used as a metric to optimize content delivered to the user, advertisement campaigns, presentation strategies, targeting strategies, and so forth. Information relating to the user's active time spent can also be used to determine a presentation's performance with the user and the user's reaction to specific aspects of the presentation. Further, the user's active time spent can also be reported to advertisers, publishers, networks, and so forth, which they can use to optimize the presentation of content or campaign, for example. The user's active time spent can be used to prevent fraud based on inaccurate metrics, such as click fraud from publishers, and can help determine more accurate and realistic metrics for mobile content.

Disclosed are devices, systems, methods, and non-transitory computer-readable storage media for optimizing and reporting time spent by a user engaged in a session. The system first obtains data associated with a presentation of an item of content at a mobile device, the presentation being divided into multiple partitions. The presentation can include any type of content presented at a mobile device, such as a mobile advertisement, a video, a file, text, an image, media content, etc. Moreover, the presentation can be a user session at a mobile device, for example. The system can divide the user session into partitions associated with content of the presentation.

The presentation can be divided into the multiple partitions based on a partitioning scheme. The partitioning scheme can be based on one or more factors and parameters, such as a predefined partition length, a type of content of the presentation, an amount of content associated with the presentation, a type of mobile device, user activity, device activity, presentation characteristics, events, etc. In some embodiments, the presentation is partitioned based on events associated with the presentation. The events can include any event detected by the mobile device or the system. For example, the events can include an input from the user, a request from the mobile device, a flag, an activity at the mobile device, a movement, a change of location, a navigation request, a command, etc. In other embodiments, the presentation can be partitioned based on a fixed amount of time. For example, the presentation can be partitioned into 20-second segments.

In some cases, the system can monitor the presentation or receive statistics about the presentation and use any of the information identified to divide the presentation according to the partitioning scheme. For example, the system can obtain information regarding the length of the presentation, any events in the presentation, any inputs in the presentation, the content of the presentation, etc., and use that information to divide the presentation into partitions according to the partitioning scheme. Indeed, the system can divide the presentation into partitions based on any of the data associated with the presentation that is obtained by the system.

The data obtained by the system can include, for example, a total amount of time of the presentation, a total amount of time of the combined partitions, a time of inactivity associated with one or more partitions, an event detected at the mobile device, an event detected at the system, a location of the mobile device, etc. The data can also include an input associated with the presentation or the mobile device, such as a gesture, a request, a view, a movement, a display, an activity, an action, a click, a navigation command, etc. The system can monitor the presentation to obtain the data. The system can also obtain the data directly from the mobile device. However, in some cases, the system can obtain the data from a server that collects data and statistics associated with presentations at the mobile device.

Based on the data, the system adjusts at least one respective length of time associated with the multiple partitions to yield at least one adjusted length of time, the at least one adjusted length of time reflecting estimated time of user engagement with content associated with at least one of the multiple partitions. For example, the system can analyze the partitions and adjust the length of time for any of the partitions based on the data. The adjusted length of time for a partition can reflect an estimated time of user engagement with the content associated with that partition. Thus, the adjusted length of time for a partition can include the total length of time of the partition minus an estimated time of disengagement by the user. The time of disengagement by the user can include, for example, a period of time that the user is not paying attention to the content of the partition or engaging in the content of the partition. In some cases, the time of disengagement can be partly based on user inactivity. However, in some cases, user inactivity can be a result of passive engagement by the user. Thus, here, one or more portions of user inactivity can be attributed to user engagement as opposed to user disengagement.

In some embodiments, the adjusted length of time of a partition can be based on a fixed length of time. For example, the system can set a limit of 40 seconds per partition, and adjust to 40 seconds any partition exceeding the 40-second limit. The time limit imposed by the system can be based on the data, statistics, prior performance, a historical analysis, a study of user behavior, a type of content of the partition, an amount of content of the partition, characteristics of the presentation, characteristics of the mobile device, etc.

The system then determines an amount of time spent by a user at the mobile device engaging in the presentation based on the at least one adjusted length of time and the multiple partitions. The amount of time can represent the total amount of time of user engagement in the presentation. The total amount of time of user engagement can be determined by adding all the partitions of the presentation, including the adjusted partitions. For example, if three out of five partitions in the presentation are adjusted according to a specific length of time, the total amount of time can be determined by adding the adjusted times of the three adjusted partitions with the two remaining, unadjusted partitions. The system can also analyze the adjusted times/partitions to determine which partitions the user was not engaged in, how many much time the user spent disengaged per partition, how much time the user spent disengaged as a whole, what type of content is associated with periods of user disengagement/engagement, etc. The system can also analyze the total amount of time of the presentation and compare it with the total amount of time of the presentation after any time adjustments. For example, the system can determine the ratio between the total time of the presentation before and after any adjustment. This way, the system can determine the percentage of time spent by the user engaged or disengaged in the presentation.

The system can use the ratio of time spent by the user engaged or disengaged in the presentation, the total time of engagement or disengagement, activity associated with one or more partitions, and/or user behavior associated with the presentation to modify the presentation, the partitions, the content, the delivery of the presentation, etc. The system can also report this information to another system, such as a server, or maintain this information and statistics for future use.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4A and FIG. 4B illustrate exemplary system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for accurate and efficient metrics for determining active time spent by a user engaged in a session. Disclosed are systems, methods, and non-transitory computer-readable storage media for optimizing and reporting time spent by a user engaged in a session. A brief introductory description of an exemplary configuration of devices and a network is disclosed herein. A detailed description of active time spent metrics and optimization, and exemplary variations will then follow. These variations shall be described herein as the various embodiments are set forth. The disclosure now turns to FIG. 1.

Figure 1:
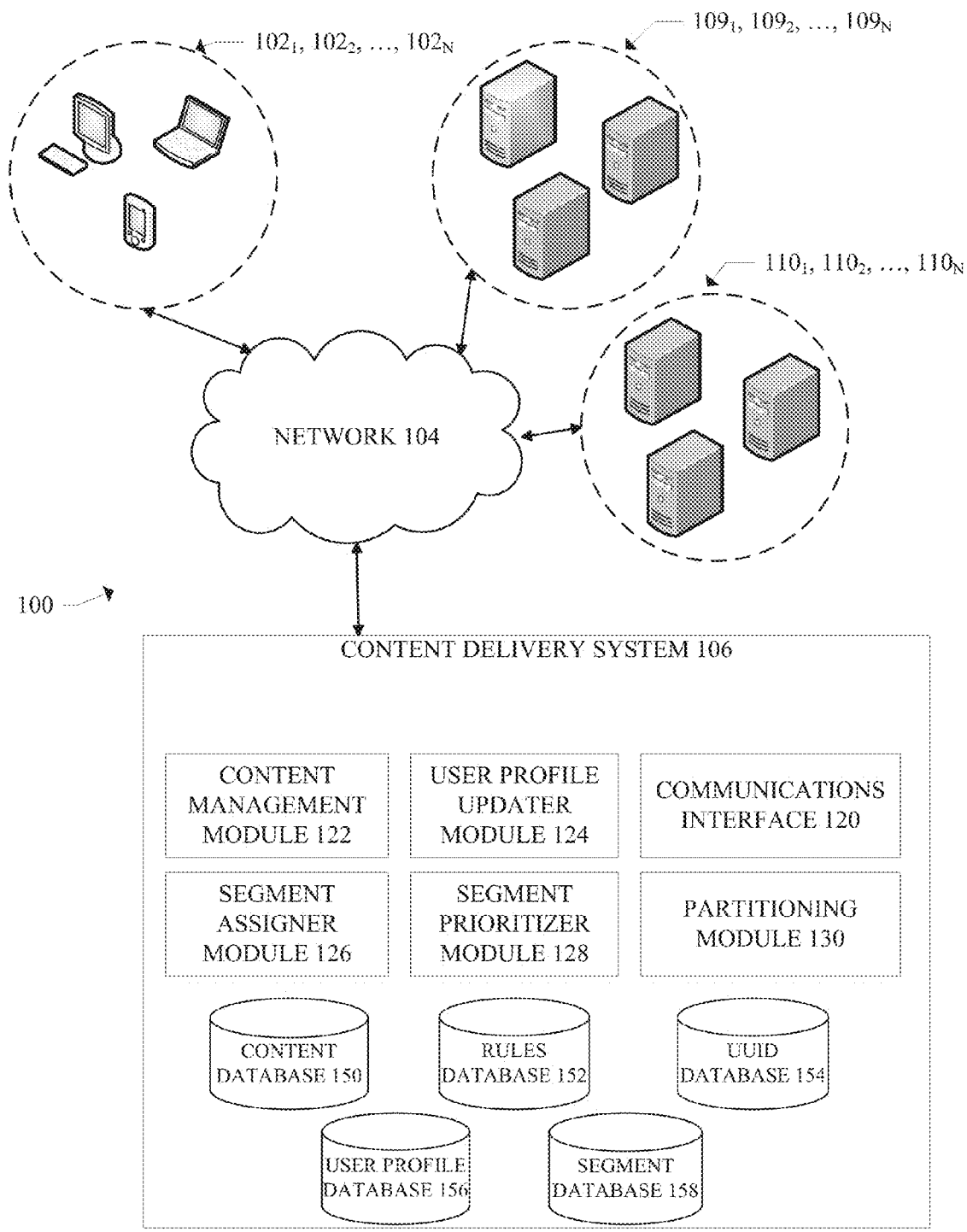
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, . . . , $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1, 109_2, \ldots, 109_n$ (collectively "109") and content from one or more secondary content providers $110_1, 110_2, \ldots 110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal $102_i$ while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user (s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124.

In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24;

location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

In some embodiments, the content delivery system 106 can include a partitioning module 130. The partitioning module 130 can perform partitioning tasks based on the configuration of the content delivery system 106. In some configurations, the partitioning module 130 can divide content, such as a presentation of content, or a user session into partitions of time. The partitioning module 130 can divide the content or user session as further described below in FIGS. 2-3. While FIG. 1 illustrates the partitioning module 130 as a component of the content delivery system 106, one of ordinary skill in the art will readily recognize that the partitioning module 130 can be separate from the content delivery system 106. For example, in some cases, the partitioning module 130 can be a component of content provider $109_i$, content provider $110_i$, user terminal $102_i$, or any other server or client device.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 2A:
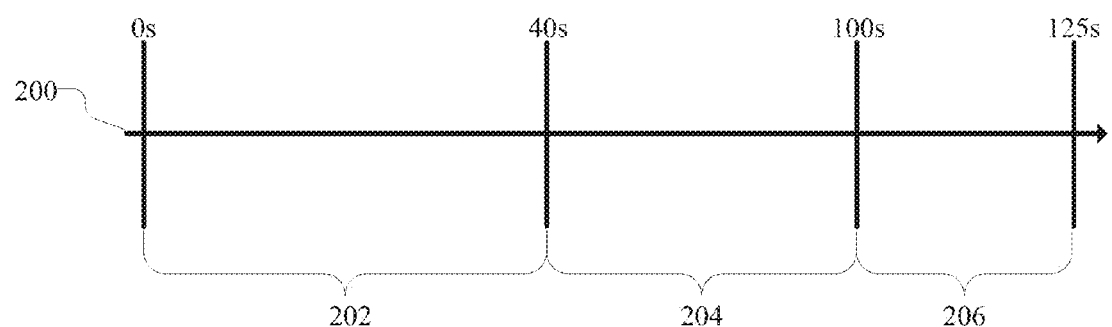
FIG. 2A illustrates an exemplary presentation partitioned into multiple partitions.

The disclosure now turns to a discussion of active time spent metrics and optimization, followed by a discussion of an exemplary presentation partitioned into multiple partitions, illustrated in FIG. 2A.

Active time spent by a user engaging in invitational content can be used as a metric to optimize the invitational content and report statistics to customers, advertisers, and publishers. An active time spent metric can be used, for example, to maximize and showcase how much engagement advertisers receive for their campaigns. A user's time spent in a user session can be correlated with this type of engagement. However, active time spent can provide a more comprehensive and realistic representation of the user's experience and engagement, as active time spent can include any time the user spends actively engaging in the content throughout the user session, as well as any time the user spends passively engaging in the content, and can also ignore any time the user spends disengaged with the content.

For example, there are many instances where the user spends time in a user session without attending to his or her device because the user has become distracted with another activity, because the user has chosen to complete the user session without actually closing the user session, or for various other reasons. Often, this idle time cannot be determined entirely by inactivity as measured by a gyroscope or accelerometer in the mobile device, as the user may be passively engaged in the content. Similarly, actual activity measured by a gyroscope or accelerometer can be misleading, as such activity can be a result of the user placing their mobile device in a pocket or purse before closing the user session, and carrying the mobile device with them thus fooling the mobile device's sensors into believing the mobile device is still in active use. These examples can be very common with mobile devices. However, active time spent can be used to determine the time the user is actually engaged in the content, and limit any time spent by a user disengaged as illustrated in the previous examples.

To calculate active time spent a user session can be divided into partitions, and a length of time of user engagement can be calculated for each time partition. The partitions can be a fixed length (e.g., 10 seconds each), or can be of a variable length depending on what events have been received or detected. For example, a time partition can be defined by splitting up the user session into times between all views (visible elements appearing on the screen) and videos, between gestures (e.g., tap, swipe, pinch, zoom, shake, etc.), voice commands and conversions (e.g., camera, phone, map, social media sharing, calendar, reminders, passbook, external webview, etc.), or between all view, video, gesture, and conversion events produced by the mobile device.

Each time partition can begin with a time value based on the simple difference between the absolute event time of its starting and ending point. These individual partitions can be modified, however, based on the timing of events, or based on any other events or activities that have occurred during each time partition.

Moreover, a time partition can be reduced from its original time value to a given value (e.g., down from 30 seconds to 15 seconds). A time partition can be reduced to a given value based on a time limit, inactivity, an input, an event, an interaction, a location, user behavior, statistics, content characteristics, and so forth. Exceptions can be made to time reduction in specific events, such as events that normally result in passive behavior from the user, without necessarily indicating a lack of user engagement. For example, video, audio, or animation events often involve passive engagement from the user. In cases where the partitions are based on a fixed time, an event in the user session can prevent time from being reduced in a time partition if the event happens within the partition. In cases where the partitions are based on a variable time length, an event in the user session can prevent time from being reduced if it happens as the first event in the time partition, in which case the event would mark the border of the time partition. Exceptions can also be made to time reduction in specific events occurring which are inherently active interactions, such as gestures, voice commands, and conversions, for example.

A time partition can be reduced from its original value to a new value which can vary based on which event occurred during the time partition and/or at the start of the time partition. For example, for a given event, the original value of a time partition can be reduced down to 0 seconds, 10 sec, 30 seconds, etc. Moreover, the amount a time partition is reduced can also depend on whether the gestures or inputs which occurred during that time partition actually match to a list of possible gestures or inputs enabled for that partition (e.g., tapping on a defined button as opposed to tapping in a nontappable area). Any matches or mismatches can be known via an additional boolean payload in each gesture or input event, which reports whether the gesture or input triggered further events in the user session or not. The amount that a total time total the time partition is reduced can be based on whether all gestures or inputs match, whether no gestures or inputs match, whether a majority of gestures or inputs match, or proportionally depending on what portion of the gestures or inputs match.

The active time spent metric can be used to optimize serving of campaigns. For example, a given campaign can be targeted to the context segments or user segments which have the best active time spent. Active time spent can also be used in conjunction with regular time spent metrics, views metrics, gesture metrics, conversion metrics, etc. For example, a campaign can be primarily optimized based on active time spent, but alternatively served based on regular time spent or any other metrics.

Active time spent can also be used in the optimization of creatives. When considering alternative versions of an advertising unit creative, a creative with the maximum active time spent can be chosen to promote maximal user engagement, whether or not active time spent is actually used in the targeting optimization of the campaign. Moreover, active time spent can also be reported directly to advertisers and advertising network traffickers. For example, an active time spent total can be reported to advertisers or publishers for each of their campaigns. As another example, a stacked bar graph or any other illustration can be reported to advertisers or advertisement traffickers, showing what portion of the total (regular) time spent within an advertising unit is active time spent. This can assist an advertiser or advertisement trafficker in determining which portions of the network they wish to serve their advertisements to. For example, advertisers or advertisement traffickers can analyze active time spent percentages in different demographic categories, and determine which demographic group is the most actively engaged with the advertisement. As one of ordinary skill in the art will readily recognize after reading this disclosure, active time spent can also be reported in other ways and formats, such as graphs, tables, charts, reports, documents, images, maps, statistics, etc. Further, active time spent metrics can also be reported with additional information, such as suggestions, comments, alerts, notifications, links, historical data, etc.

The disclosure now turns to FIG. 2A, which illustrates an exemplary presentation 200 partitioned into multiple partitions. The presentation 200 can be a presentation of content in a user session. For example, the presentation 200 can be a mobile advertisement, a video, audio, or any other media content. The presentation 200 is divided into partitions 202-206. Partition 202 has a start time value of 0 seconds, which corresponds to the start of the partition 202 and can also correspond to the start of the presentation 200, and an end time value of 40 seconds, which corresponds to the end of the partition 202. Partition 204 has a start time value of 40 seconds, which corresponds to the end of the partition 202 and start of the partition 204, and an end time value of 100 seconds, which corresponds to the end of the partition 204. Partition 206 has a start time value of 100 seconds, which corresponds to the end of the partition 204 and the start of the partition 206, and an end time value of 125 seconds, which corresponds to the end of the partition 206 and can also correspond to the end of the presentation 200. As one of ordinary skill in the art will readily recognize, the partitions 202-206 can span a portion of the presentation 200 or can span the entirety of the presentation 200. For example, in some cases, the presentation 200 can have a period of time between the start of partition 202 and/or the end of the partition 206. Further, the partitions 202-206, in some cases, can have a period of time between one or more of partitions 202-206.

The presentation 200 can be divided into the partitions 202-206 based on a partitioning scheme. For example, the presentation 200 can be partitioned based on events or inputs. In FIG. 2A, the partitions 202-206 are divided according to variable time lengths. However, in some embodiments, the presentation 200 can be divided into partitions of time that are based on a predefined time. For example, the presentation 200 can be divided into 20-second segments.

Figure 2B:
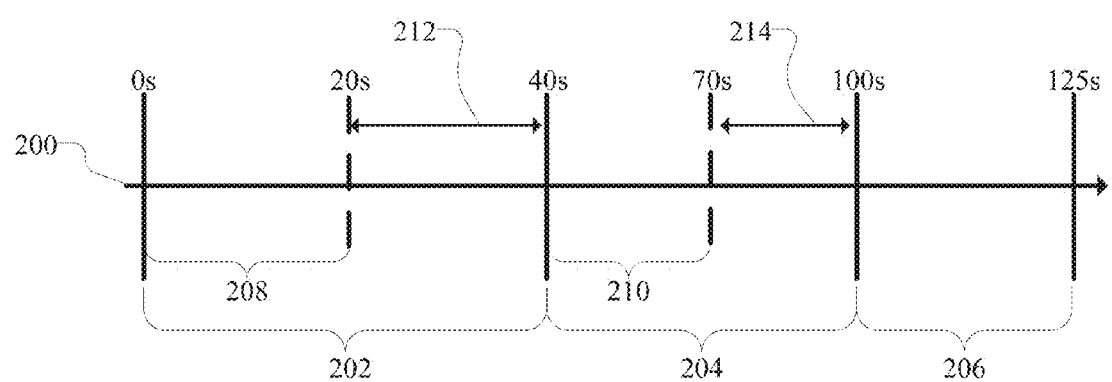
FIG. 2B illustrates an exemplary presentation with adjusted partitions.

FIG. 2B illustrates an exemplary presentation 200 with adjusted partitions. The presentation 200 can be divided into partitions 202-206, as illustrated in FIG. 2A. Partition 202 can have an original start value of 0 seconds and an original end value of 40 seconds, partition 204 can have an original start value of 40 seconds and an original end value of 100 seconds, and partition 206 can have an original start value of 100 seconds and an original end value of 125 seconds. The original end values of one or more of the partitions 202-206 can then be adjusted based on one or more factors. For example, the original end values can be adjusted based on a period of user disengagement estimated for the associated partition. The user disengagement can be calculated based on inactivity, characteristics of the content associated with the partition, or characteristics associated with one or more events or inputs in the associated partition. For example, if a partition includes a detected movement of the user and an unexpected input from the user, such as a swipe of an area that does not match a valid swipe or area, then period of time associated with the movement and the unexpected input in that specific partition can be reduced from the total time of that partition.

In FIG. 2B, partition 202 is adjusted based on a period of user disengagement 212 to yield adjusted partition 208, which has the same original start value of 0 seconds and an adjusted end value of 20 seconds. Partition 204 is similarly adjusted based on a period of user disengagement 214 to yield adjusted partition 210, which has the same original start value of 40 seconds and an adjusted end value of 70 seconds. In partition 206, the user was engaged throughout the partition and, therefore, the partition 206 is not adjusted and contains the original start and end values of 100 seconds and 125 seconds, respectively.

In some embodiments, the original end values of one or more of the partitions 202-206 can be adjusted based on a time limit defined for each of the partitions 202-206. To illustrate, if the partitions 202-206 are set to have a time limit of 20 seconds, then any of the partitions 202-206 having a length of time that exceeds the 20 seconds will be reduced to 20 seconds. Any partition that does not exceed the 20 seconds can be left unadjusted or can otherwise be adjusted based on one or more factors, as detailed above.

Adjusted partitions 208 and 210 can be combined with the unadjusted partition 206 to determine a total active time spent by the user engaged in the presentation. Thus, since adjusted partition 208 is 20 seconds long, adjusted partition 210 is 30 seconds long, and unadjusted partition 206 is 25 seconds long, the total active time spent by the user can be 75 seconds, which is the combined length of time of adjusted partitions 208 and 210 and unadjusted partition 206. The total active time spent by the user (i.e., 75 seconds) can also be compared with the total time of the presentation (i.e., 125 seconds) to determine a percentage of active time spent, a performance, an efficiency, etc.

Figure 3:
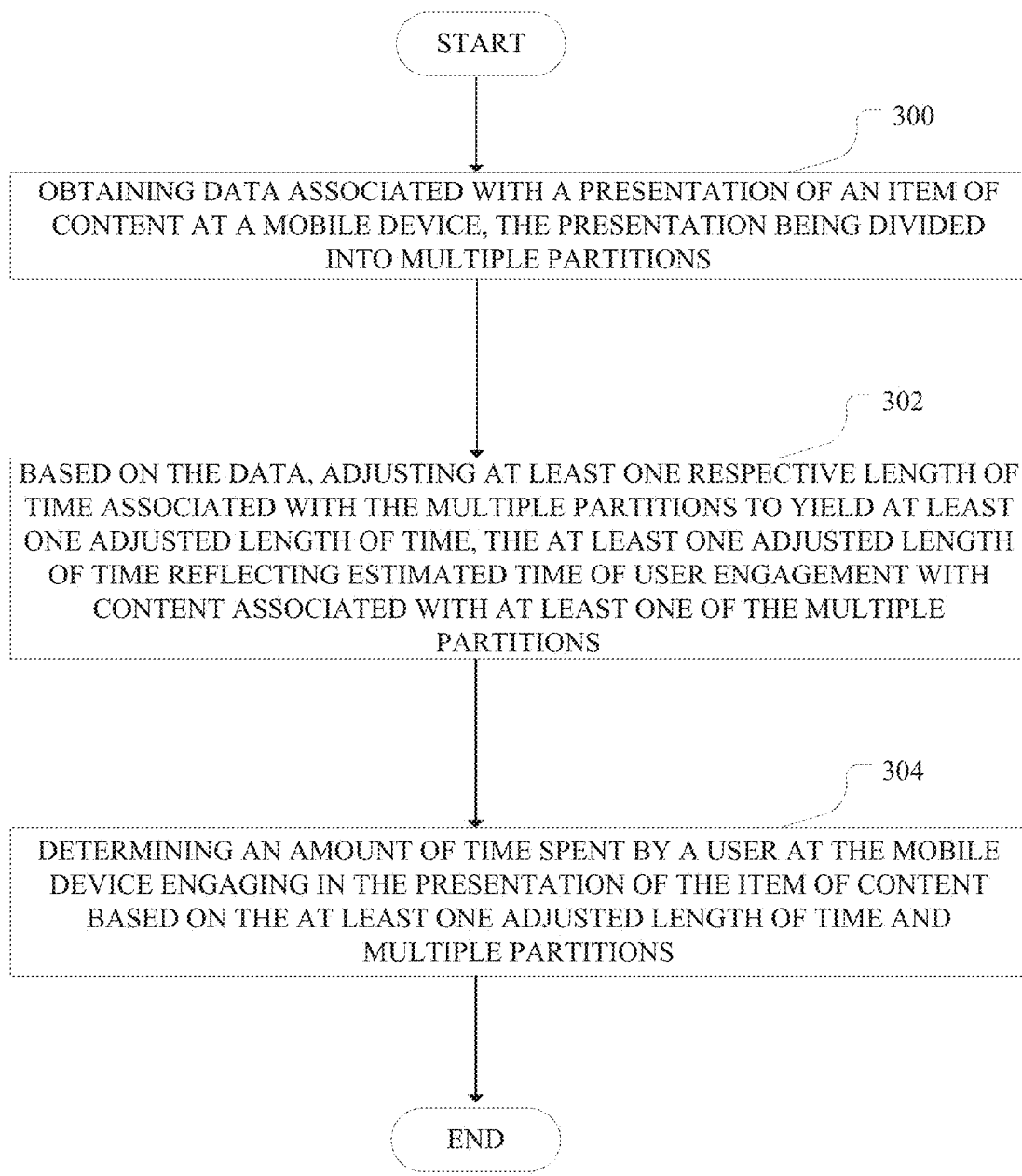
FIG. 3 illustrates an exemplary method embodiment.

Having disclosed some basic system components and concepts, the disclosure now turns to the exemplary method embodiment shown in FIG. 3. For the sake of clarity, the method is described in terms of a content delivery system 106, as shown in FIG. 1, configured to practice the method. The steps outlined herein are exemplary and can be implemented in any combination thereof, including combinations that exclude, add, or modify certain steps.

The content delivery system 106 first obtains data associated with a presentation of an item of content at a mobile device, the presentation being divided into multiple partitions (300). The presentation can include any type of content presented at a mobile device, such as a mobile advertisement, a video, a file, text, an image, media content, etc. Moreover, the presentation can be a user session at a mobile device, for example. The content delivery system 106 can divide the user session into partitions associated with content of the presentation.

The presentation can be divided into the multiple partitions based on a partitioning scheme. The partitioning scheme can be based on one or more factors and parameters, such as a predefined segment length, a type of content of the presentation, an amount of content associated with the presentation, a type of mobile device, user activity, device activity, presentation characteristics, events, inputs, views, etc. In some embodiments, the presentation is partitioned based on events associated with the presentation. The events can include any event at the mobile device or the content delivery system 106. For example, the events can include an input from the user, a request from the mobile device, a flag, an activity at the mobile device, a movement, a change of location, a navigation request, a command, a gesture, a view, a response, etc. In other embodiments, the presentation can be partitioned based on a fixed amount of time. For example, the presentation can be partitioned into 20-second segments.

In some cases, the content delivery system 106 can monitor the presentation or receive statistics about the presentation and use any of the information identified to divide the presentation according to the partitioning scheme. For example, the content delivery system 106 can obtain information regarding the length of the presentation, expected or detected events in the presentation, inputs in the presentation, the content of the presentation, etc., and use that information to divide the presentation into partitions according to the partitioning scheme. Indeed, the content delivery system 106 can divide the presentation into partitions based on the actual data obtained by the content delivery system 106 in step 300.

The data obtained by the content delivery system 106 can include, for example, a total amount of time of the presentation, a total amount of time of the combined partitions, a time of inactivity associated with one or more partitions, an event detected at the mobile device, an event detected at the content delivery system 106, a location of the mobile device, an activity at the mobile device, etc. The data can also include an input associated with the presentation or the mobile device, such as a gesture, a request, a view, a movement, a display, an activity, an action, a click, a swipe, a navigation command, etc. The content delivery system 106 can monitor the presentation to obtain the data, or it can obtain the data directly from the mobile device. However, in some cases, the content delivery system 106 can obtain the data from a server that collects data and statistics associated the presentation at the mobile device.

Based on the data, the content delivery system 106 adjusts at least one respective length of time associated with the multiple partitions to yield at least one adjusted length of time, the at least one adjusted length of time reflecting estimated time of user engagement with content associated with at least one of the multiple partitions (302). For example, the content delivery system 106 can analyze the partitions and adjust the length of time for any of the partitions based on the data. The adjusted length of time for a partition can reflect an estimated time of user engagement with the content associated with that partition. In other words, the adjusted length of time for a partition can include the total length of time of the partition minus an estimated time of disengagement by the user. The time of disengagement by the user can include, for example, a period of time that the user is not paying attention to the content of the partition or engaging in the content of the partition. In some cases, the time of disengagement can be partly based on user inactivity. However, in some cases, user inactivity can be a result of passive engagement by the user. Thus, here, one or more portions of user inactivity can be attributed to user engagement as opposed to user disengagement. The content delivery system 106 can determine user disengagement based on specific movements and inputs detected at the mobile device. For example, if the mobile device detects movement and an unexpected swipe, the content delivery system 106 can determine that the time associated with this movement and unexpected swipe can be a result of the user improperly closing the presentation before putting the mobile device in his or her pocket. Accordingly, this time can be attributed to user disengagement. Additional factors that can be analyzed in determining user disengagement are further explained in the previous discussion of active time spent.

In some embodiments, the adjusted length of time of a partition can be based on a fixed length of time specified for that partition. For example, the content delivery system 106 can set a limit of 40 seconds per partition, and adjust to 40 seconds any partition exceeding the 40-second limit. The time limit imposed by the content delivery system 106 can be based on the data, statistics, prior performance, a historical analysis, a study of user behavior, a type of content of the partition, an amount of content of the partition, characteristics of the presentation, characteristics of the mobile device, etc.

The content delivery system 106 then determines an amount of time spent by a user at the mobile device engaging in the presentation based on the at least one adjusted length of time and the multiple partitions (304). The amount of time can represent the total amount of time of user engagement in the presentation. In other words, the amount of time can represent the active time spent by the user, which can correspond to the total amount of time of the presentation minus any period of disengagement by the user.

The total amount of time of user engagement can be determined by adding all the partitions of the presentation, including the adjusted segments. For example, if three out of five partitions in the presentation are adjusted according to a specific length of time, the total amount of time can be determined by adding the adjusted times of the three adjusted partitions with the two remaining, unadjusted partitions. Here, the combined length of time can reflect that total time spent by the user engaging in the presentation, excluding any time spent by the user disengaged or distracted from the presentation. The content delivery system 106 can also further adjust the total, combined length of time calculated by adding the partitions. For example, the content delivery system 106 can define a time limit for the presentation, which can be a fixed length of time defining the maximum amount of time a user is expected to spend engaging in the content based on one or more factors, such as the type of content of the presentation or the amount of content of the presentation. If the combined length of time of the partitions exceeds the time limit, the content delivery system 106 can then adjust the combined length of time of the partitions to be within the time limit. For example, if the time limit for a presentation is 160 seconds, and the length of time of the combined partitions equals 165 seconds, the content delivery system 106 can adjust the length of time of the combined partitions to 160 seconds.

The content delivery system 106 can also analyze the adjusted times/partitions to determine which partitions the user was not engaged in, how many much time the user spent disengaged per partition, how much time the user spent disengaged as a whole, what type of content is associated with periods of user disengagement/engagement, etc. The content delivery system 106 can also analyze the total amount of time of the presentation and compare it with the total amount of time of the presentation after any time adjustments. For example, the content delivery system 106 can determine the ratio between the total time of the presentation before and after any adjustment. This way, the content delivery system 106 can determine the percentage of time spent by the user engaged or disengaged in the presentation.

The content delivery system 106 can use the ratio of time spent by the user engaged or disengaged in the presentation, the total time of engagement or disengagement, activity associated with one or more partitions, and/or user behavior associated with the presentation to modify the presentation, the partitions, the content, the delivery of the presentation, etc. The content delivery system 106 can also report this information to another system, such as a server, or maintain this information and statistics for future use. The content delivery system 106 can report this information as a graph, an image, a chart, a table, a report, a listing, etc. The content delivery system 106 can also report additional information associated with active time spent, such as likelihood of active time spent, a likelihood of engagement or disengagement associated with one or more partitions, a methodology for determining active time spent, an alert, a notification, a link, etc.

FIG. 4A illustrates a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that exemplary systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

I claim:

1. A method comprising:
    obtaining data indicating user input during a presentation of an item of content at a mobile device, the presentation being divided into at least a first partition and a second partition, wherein the first partition is associated with a first set of enabled inputs and the second partition is associated with a second set of enabled inputs, the first set of enabled inputs being different than the second set of enabled inputs;
    determining, based on the data, user inputs that occurred during the first partition of the presentation that are not included in the first set of enabled inputs, and user inputs that occurred during the second partition of the presentation that are not included in the second set of enabled inputs;
    adjusting, based on the inputs that occurred during the first partition of the presentation that are not included in the first set of enabled inputs a first length of time associated with the first partition to yield a first adjusted length of time for the first partition reflecting estimated time of user engagement with the item of content during the first partition;
    adjusting, based on the inputs that occurred during the second partition of the presentation that are not included in the second set of enabled inputs, a second length of time associated with the second partition to yield a second adjusted length of time for the second partition reflecting estimated time of user engagement with the item of content during the second partition; and
    determining an amount of time spent by a user at the mobile device engaging in the presentation of the item of content based on at least the first adjusted length of time for the first partition and the second adjusted length of time for the second partition.

2. The method of claim 1, wherein the data comprises a total amount of time associated with the first partition and the second partition, and wherein the amount of time spent by a user at the mobile device engaging in the presentation of the item of invitational content is further based on the total amount of time.

3. The method of claim 2, wherein the user input comprises at least one of a gesture, a request, a conversion, a movement, a display, a click, and a view.

4. The method of claim 3, wherein the data comprises a time of inactivity associated with the first partition and the second partition.

5. The method of claim 1, wherein adjusting the first length of time associated with the first partition is further based on at least one of a period of inactivity or a length of the first partition.

6. The method of claim 1, wherein adjusting the first length of time associated with the first partition is further based on a time limit defined for the first partition.

7. The method of claim 1, further comprising determining a ratio of a total amount of time associated with the presentation and the amount of time spent by the user engaging in the presentation of the item of invitational content.

8. The method of claim 1, wherein adjusting the first length of time associated with the first partition is further based on a time limit defined for the first partition, the method further comprising:
    determining that the first length of time associated with the first partition exceeds the time limit; and
    reducing the first length of time associated with the first partition to the time limit.

9. The method of claim 1, further comprising, based on the amount of time spent by the user engaging in the presentation of the item of invitational content, modifying at least one of the presentation and a content associated with the presentation.

10. A computing device comprising:
    one or more computer processors; and
    a memory storing instructions that, when executed by the one or more computer processors, cause the computing device to:
        obtain data indicating user input during a presentation of an item of content at a mobile device, the presentation being divided into at least a first partition and a second partition, wherein the first partition is associated with a first set of enabled inputs and the second partition is associated with a second set of enabled inputs, the first set of enabled inputs being different than the second set of enabled inputs;
        determine, based on the data, user inputs that occurred during the first partition of the presentation that are not included in the first set of enabled inputs, and user inputs that occurred during the second partition of the presentation that are not included in the second set of enabled inputs;

adjust, based on the inputs that occurred during the first partition of the presentation that are not included in the first set of enabled inputs, a first length of time associated with the first partition to yield a first adjusted length of time for the first partition reflecting estimated time of user engagement with the item of content during the first partition;

adjust, based on the inputs that occurred during the second partition of the presentation that are not included in the second set of enabled inputs, a second length of time associated with the second partition to yield a second adjusted length of time for the second partition reflecting estimated time of user engagement with the item of content during the second partition; and determine an amount of time spent by a user at the mobile device engaging in the presentation of the item of content based on at least the first adjusted length of time for the first partition and the second adjusted length of time for the second partition.

11. The computing device of claim 10, wherein the data comprises a total amount of time associated with the first partition and the second partition, and wherein the amount of time spent by a user at the mobile device engaging in the presentation of the item of invitational content is further based on the total amount of time.

12. The computing device of claim 11, wherein the user input comprises at least one of a gesture, a request, a conversion, a movement, a display, a click, and a view.

13. The computing device of claim 12, wherein the data comprises a time of inactivity associated with the first partition and the second partition.

14. The computing device of claim 10, wherein adjusting the first length of time associated with the first partition is further based on at least one of a period of inactivity or a length of the first partition.

15. The computing device of claim 10, wherein adjusting the first length of time associated with the first partition is further based on a time limit defined for the first partition.

16. The computing device of claim 10, wherein the instructions further cause the computing device to:
determine a ratio of a total amount of time associated with the presentation and the amount of time spent by the user engaging in the presentation of the item of invitational content.

17. The computing device of claim 10, wherein adjusting the first length of time associated with the first partition is further based on a time limit defined for the first partition, wherein the instructions further cause the computing device to:
determine that the first length of time associated with the first partition exceeds the time limit; and
reduce the first length of time associated with the first partition to the time limit.

18. The computing device of claim 10, wherein the instructions further cause the computing device to:
modify, based on the amount of time spent by the user engaging in the presentation of the item of invitational content, at least one of the presentation and a content associated with the presentation.

19. A non-transitory computer-readable medium storing instructions that, when executed by a computing device, cause the computing device to:
obtain data indicating user input during a presentation of an item of content at a mobile device, the presentation being divided into at least a first partition and a second partition, wherein the first partition is associated with a first set of enabled inputs and the second partition is associated with a second set of enabled inputs, the first set of enabled inputs being different than the second set of enabled inputs;

determine, based on the data, user inputs that occurred during the first partition of the presentation that are not included in the first set of enabled inputs, and user inputs that occurred during the second partition of the presentation that are not included in the second set of enabled inputs;

adjust, based on the inputs that occurred during the first partition of the presentation that are not included in the first set of enabled inputs, a first length of time associated with the first partition to yield a first adjusted length of time for the first partition reflecting estimated time of user engagement with the item of content during the first partition;

adjust, based on the inputs that occurred during the second partition of the presentation that are not included in the second set of enabled inputs, a second length of time associated with the second partition to yield a second adjusted length of time for the second partition reflecting estimated time of user engagement with the item of content during the second partition; and determine an amount of time spent by a user at the mobile device engaging in the presentation of the item of content based on at least the first adjusted length of time for the first partition and the second adjusted length of time for the second partition.

20. The non-transitory computer-readable medium of claim 19, wherein the data comprises a total amount of time associated with the first partition and the second parting, and wherein the amount of time spent by a user at the mobile device engaging in the presentation of the item of invitational content is further based on the total amount of time.

21. The non-transitory computer-readable medium of claim 20, wherein the user input comprises at least one of a gesture, a request, a conversion, a movement, a display, a click, and a view.

22. The non-transitory computer-readable medium of claim 21, wherein the data comprises a time of inactivity associated with the first partition and the second partition.

23. The non-transitory computer-readable medium of claim 19, wherein adjusting the first length of time associated with the first partition is further based on at least one of a period of inactivity or a length of the first partition.

24. The non-transitory computer-readable medium of claim 19, wherein adjusting the first length of time associated with the first partition is further based on a time limit defined for the first partition.

25. The non-transitory computer-readable medium of claim 19, wherein the instructions further cause the computing device to:
determine a ratio of a total amount of time associated with the presentation and the amount of time spent by the user engaging in the presentation of the item of invitational content.

26. The non-transitory computer-readable medium of claim 19, wherein adjusting the first length of time associated with the first partition is further based on a time limit defined for the first partition, wherein the instructions further cause the computing device to:
determine that the first length of time associated with the first partition exceeds the time limit; and reduce the first length of time associated with the first partition to the time limit.

* * * * *